United States Patent [19]

Herb

[11] Patent Number: 4,692,076
[45] Date of Patent: Sep. 8, 1987

[54] EXPANSION DOWEL WITH ANCHORED STATE INDICATOR

[75] Inventor: Armin Herb, Peissenberg, Fed. Rep. of Germany

[73] Assignee: "L'Oreal", Paris, France

[21] Appl. No.: 833,813

[22] Filed: Feb. 26, 1986

[30] Foreign Application Priority Data

Feb. 28, 1985 [DE] Fed. Rep. of Germany ....... 3507022

[51] Int. Cl.$^4$ ............................................. F16B 13/06
[52] U.S. Cl. ...................................... 411/55; 411/57; 411/9
[58] Field of Search .................... 411/8, 9, 10, 11, 34, 411/35, 36, 37, 55, 57, 60, 62

[56] References Cited

U.S. PATENT DOCUMENTS

| 1,394,925 | 10/1921 | Marshall | 411/34 |
| 3,285,120 | 11/1968 | Kartiala | 411/8 |
| 3,735,665 | 5/1973 | Mordensen | 411/36 |
| 4,088,054 | 5/1978 | Lippacher et al. | 411/57 |
| 4,112,813 | 9/1978 | Kuhlmann | 411/49 |
| 4,330,230 | 5/1982 | Giannuzzi | 411/55 |

FOREIGN PATENT DOCUMENTS

| 2536136 | 3/1977 | Fed. Rep. of Germany | 411/55 |
| 2658996 | 6/1978 | Fed. Rep. of Germany | 411/8 |
| 2815998 | 10/1979 | Fed. Rep. of Germany | 411/55 |
| 3023411 | 1/1982 | Fed. Rep. of Germany | 411/34 |
| 3031048 | 3/1982 | Fed. Rep. of Germany | 411/57 |
| 3148730 | 7/1983 | Fed. Rep. of Germany | 411/10 |
| 1400747 | 4/1965 | France | 411/55 |
| 6702826 | 8/1967 | Netherlands | 411/62 |
| 338589 | 7/1959 | Switzerland | 411/55 |

Primary Examiner—Gary L. Smith
Assistant Examiner—Neill Wilson
Attorney, Agent, or Firm—Cushman, Darby & Cushman

[57] ABSTRACT

An expansion dowel includes an axially elongated expansion sleeve, an expansion body and a threaded bolt secured to the expansion body. The expansion sleeve has a leading end arranged to be inserted first into a borehole in a receiving material and a trailing end. The expansion sleeve is slotted in the axial direction from the leading end so that the sleeve expands radially as the threaded bolt draws the expansion body into the leading end of the sleeve. Further, the sleeve has an axially deformable region between the leading and trailing ends. A shoulder extends radially outwardly from the sleeve adjacent the trailing end. A disc is held on the outside of the sleeve spaced axially from the shoulder toward the leading end of the sleeve. During the placement of the dowel, as the expansion body is drawn into the leading end of the sleeve, a minimum anchoring value is reached. After reaching the minimum anchoring value, the sleeve is axially deformed. At the same time, the disc overcomes the holding action maintaining it spaced from the shoulder and it moves axially toward the trailing end into contact with the shoulder affording a visible indication of the anchored state of the dowel.

4 Claims, 3 Drawing Figures

EXPANSION DOWEL WITH ANCHORED STATE INDICATOR

BACKGROUND OF THE INVENTION

The present invention is directed to an expansion dowel including a cylindrically shaped expansion sleeve with a leading end and a trailing end and the sleeve is slotted from the leading end. An expansion body is fitted into the leading end of the expansion sleeve for expanding it radially outwardly as the expansion body is drawn into the leading end by a threaded bolt. A shoulder is provided adjacent the trailing end of the sleeve for applying a load. Intermediate its ends, the expansion sleeve has an axially deformable region.

Expansion dowels of the above type are used chiefly in the medium and upper load ranges, such as for securing a structural component part against a receiving material into which the dowel was anchored. It is advantageous and in certain cases even essential to provide a visible indication that the required torque for effecting a minimum anchoring value has been achieved.

In one known expansion dowel an axially deformable element and a spacing sleeve are arranged between the rear end of the expansion sleeve and a load attaching shoulder. A sleeve surrounding the spacing sleeve is connected with a disc. The disc is held on the sleeve by a collar and partially punched out tabs. When a certain displacement force is exceeded, the tabs are bent back so that the load attaching shoulder can approach the disc accompanied by the deformation of the tabs and of the element arranged between the expansion sleeve and spacing sleeve. This dowel arrangement, however, requires very costly, multi-part production. Furthermore, the deformation resistance of the tabs holding the disc can not be exactly defined.

SUMMARY OF THE INVENTION

Therefore, the primary object of the present invention is to provide an expansion dowel which is easily produced and used, and affords a visual indication of the dowel's expanded condition.

In accordance with the present invention, an annular disc is held on the outside of the expansion sleeve adjacent the trailing end of the sleeve. The disc acts as an axial stop when the expansion dowel is originally inserted through a structural component part to be fastened to a receiving material. Stop means are provided for holding the disc spaced axially from the trailing end of the expansion sleeve. The disc can be axially displaced toward the trailing end against the action of the stop means after a minimum anchoring value is exceeded.

Arranging the stop means directly on the expansion sleeve affords a very simple and economical production of the expansion dowel. When the holding action of the stop means is overcome, the axial displacement of the disc relative to a load attaching shoulder at the trailing end of the sleeve occurs along with simultaneous deformation of the axially deformable region of the sleeve. When such displacement occurs a visible indication is afforded that the expansion dowel has achieved a minimum anchoring value in the receiving material. To prevent any subsequent loosening of the structural component part to be fastened to the receiving material, an additional torque is applied by means of the threaded bolt until the annular disc contacts the load attaching shoulder. When such movement of the disc is effected, possible hollow layers located between the receiving material and the structural component part can be overcome.

There are a number of ways in which the stop means can be formed on the expansion sleeve. One simple arrangement involves the formation of the stop means as deformation members. Such deformation members may be formed by upsetting the expansion sleeve in the form of an annular bead between the annular disc and the load attaching shoulder. The deformation member can also be formed as a change in cross-section. For example, the expansion sleeve can be provided with a polygonal cross-section in place of the usual circular cross-section. As a result, the corners of the polygon form projections extending outwardly from the circular cross-section.

In another preferred arrangement the deformation member is formed as outwardly extending protuberances. The protuberances can be pressed in a simple manner in a sheet metal blank used in forming the expansion sleeve in a rolling operation. An adaptation of the axial displacement of the annular disc with respect to the type of dowel or to its use, can be achieved by the number and dimensions of the protuberances formed on the outside surface of the sleeve.

Another construction of the stop means can be in the form of welded connections. The welded connection can be in the form of circumferentially extended or interrupted weld seams between the disc and the expansion sleeve. It is also possible, however, to provide pure resistance weld connections between the sleeve and the disc. Moreover, the expansion sleeve can be provided with weld points preventing axial displacement of the disc.

If the expansion dowel is in a position where it is difficult to observe, the displacement of the disc may not be easily noticed. This is particularly true where the nut on the threaded bolt applying the expanding force is chamfered at both surfaces. Accordingly, to improve the visual indication of the movement of the disc it is advantageous to provide an additional spacing disc on the expansion sleeve adjacent to the load attaching shoulder. Preferably, such a spacing disc has the same diameter as the disc spaced at an axial distance from the shoulder at the commencement of the expansion process. This spacing disc may be positioned between the rear end of the expansion sleeve and the load attaching shoulder. The anchoring procedure is completed when the two discs contact one another without any space between them.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
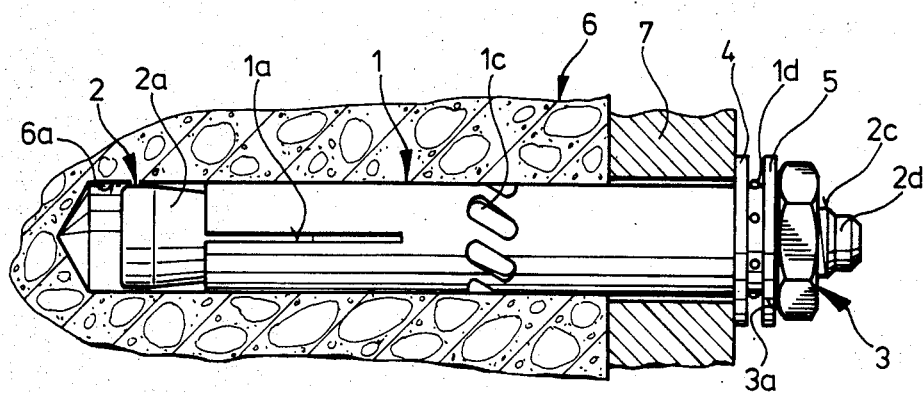
FIG. 1 is a side view, partly in section, of an expansion dowel embodying the present invention inserted into a receiving material with the dowel being in the unexpanded state.
Figure 2:
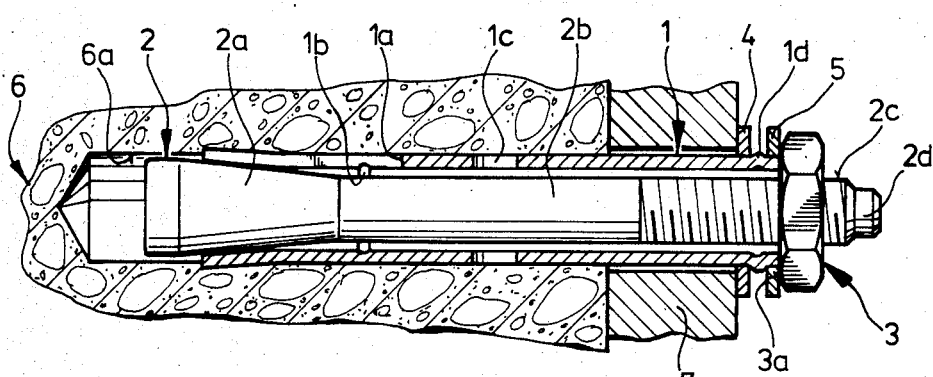
FIG. 2 is a view of the expansion dowel shown in FIG. 1 after the expansion body is partially retracted into the expansion sleeve with the sleeve shown in axially extending section.
Figure 3:
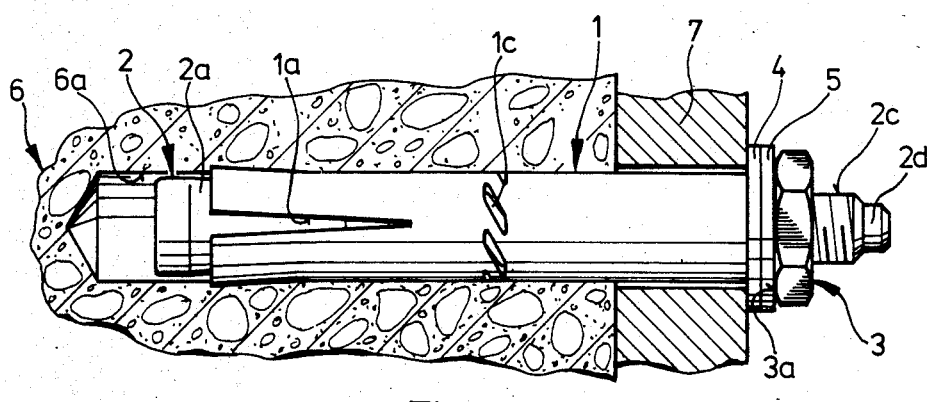
FIG. 3 is a view of the expansion dowel similar to that shown in FIGS. 1 and 2 with the dowel being illustrated in the fully anchored condition.

The expansion dowel shown in FIGS. 1, 2 and 3 is made up of an axially extending expansion sleeve 1 and a threaded bolt 2 which extends axially through the expansion sleeve. The expansion sleeve 1 and bolt 3 each have a leading end and a trailing end with the leading end being the left-hand end in FIGS. 1, 2 and 3 which is inserted first into a borehole 6a formed in a receiving material 6. Expansion sleeve 1 has axially extending slots 1'a extending from the leading end for approximately a third of the axial length toward the trailing end. Further, an annular groove 1b is formed in the inside surface of the expansion sleeve 1 in the axially extending region of the slots 1a and adjacent the inner ends of the slots for facilitating the radial widening of the axially slotted expansion region of the sleeve. In the region of the sleeve spaced midway between the leading and trailing ends, and spaced between the trailing ends of the slots 1a and the trailing end of the sleeve, is an axially deformable region 1c. The axially deformable region 1c is made up of elongated openings spaced apart by webs inclined relative to the axis of the sleeve. Adjacent the trailing end of the expansion sleeve 1 a number of circumferentially spaced protuberances 1d are formed on the outside surface of the sleeve. The leading end of the threaded bolt 2 is formed as a conically shaped expansion body 2a with the conically shaped surface diverging toward the leading end of the bolt. A cylindrically shaped shank 2b extends from the smaller diameter end of the expansion body 2a through the sleeve 1 and has a thread 2c extending from the trailing end toward the leading end. In addition, an axially extending projection 2d is formed on and extends axially outwardly from the trailing end of the bolt. The projection 2d prevents damage to the thread 2c when the dowel is driven into the borehole. The nut 3 on its surface contacting the end of the sleeve forms a load attaching shoulder 3a. An annular disc 4 is placed on the expansion sleeve and is held at an axial distance from the load attaching shoulder 3a by the protuberances 1d. In addition, a specific disc 5 is arranged on the trailing end of the expansion sleeve 1 adjacent to the load attaching shoulder 3a. In other words, the annular disc 4 is located on the leading end side of the protuberances and the spacing disc 5 is located on the trailing end side of the protuberances.

In each of FIGS. 1, 2 and 3 the expansion dowel is inserted into the borehole 6a of the receiving material 6 and the dowel fastens a structural component part 7 to the receiving material. FIG. 1 displays the expansion dowel inserted through the structural component part 7 into the borehole 6a of the receiving material 6 with the annular disc 4 located adjacent the surface of the structural component part 7 facing outwardly from the surface of the receiving material 6. As shown in FIG. 1 the dowel has been inserted into the receiving material but has not been expanded. Accordingly, the disc 4 serves as an axial stop when the dowel is initially inserted into the borehole. Axial displacement of the annular disc 4 toward the trailing end of the sleeve is prevented by the protuberances 1d. In the condition shown in FIG. 1, the region 1c has not been axially deformed. Since a more or less considerable resistance may oppose the introduction of the expansion sleeve 1 into the borehole 6a due to the diameter and condition of the borehole, the threaded bolt 2 is provided at its trailing end with the projection 2d which prevents any damage to the thread 2c if hammer blows are directed against the trailing end of the threaded bolt 2. After the dowel is inserted as shown in FIG. 1, a torque is applied to the nut 3 with the expansion body 2a being drawn into the leading end of the sleeve 1 by the action of the expansion body 2a on the bolt for affording a radial widening of the leading end region of the sleeve 1. The axially extending slots 1a and the annular groove 1b facilitate the radial widening and expansion of the sleeve 1 in the borehole 6a. The axially deformable region 1c is dimensioned so that it is axially deformed only after a minimum anchoring value is achieved for the dowel within the borehole. As can be seen in FIG. 2, with the expansion sleeve partially expanded, the disc 4 and the spacing disc 5 are still spaced apart in the axial direction. When the torque applied to the nut 3 is increased as compared to that applied in achieving the condition shown in FIG. 2, the region 1c is axially deformed. To attain the axial deformation of the sleeve, however, the spacing of the disc 4 from the disc 5 by the protuberances 1d must be overcome. Accordingly, during the axial deformation of the sleeve, the disc 4 moves against and over the protuberances 1d toward and into contact with the spacing disc 5. As a result, it can be noted that the minimum anchoring value has been reached when it can be visually observed on the outside of the sleeve that the disc 4 is moving toward the spacing disc 5. The final anchored state of the dowel is reached when the spacing disc 5 is contacted by the disc 4, that is, when the spacing between the two discs, as shown in FIGS. 1 and 2, no longer exists, that is, when the condition shown in FIG. 3 is attained. Furthermore, FIG. 3 shows the axial deformation of the region 1c, note the difference in the region 1c between FIGS. 1 and 3. If necessary, the fastening of the structural component part 7 to the receiving material 6 is pretensioned or a possible hollow layer, not shown, can be arranged between the receiving material 6 and the structural component part 7 and this hollow layer is eliminated by applying additional torque to the nut 3.

While specific embodiments of the invention have been shown and described in detail to illustrate the application of the inventive principles, it will be understood that the invention may be embodied otherwise without departing from such principles.

I claim:

1. Expansion dowel comprising an axially elongated cylindrically shaped expansion having a leading end arranged to be inserted first into a borehole in a receiving material in which the expansion dowel is anchored and a trailing end, an expansion body located at the leading end of said expansion sleeve and shaped to expand an axially extending section of said expansion sleeve from the leading end thereof when the expansion body is drawn axially into the leading end of said expansion sleeve toward the trailing end thereof, an axially elongated bolt having a leading end and a trailing end with the leading end thereof secured to said expansion body and said bolt being threaded for an axially extending section from the trailing end toward the leading end, means engageable with the threaded section of said bolt for drawing the expansion body into the leading end of said expansion sleeve, and said means forming a shoulder for securing a load on said dowel, said expansion sleeve having an axially deformable region intermediate the leading and trailing ends thereof, wherein the improvement comprises an annular disc encircling and fitted on the outside of said expansion sleeve adjacent the trailing end thereof and spaced axially from said shoulder, said disc acts as an axial stop for the initial insertion of said expansion sleeve into a receiving material, means on said sleeve for securing said disc against axial displacement toward said shoulder, and said disc being axially displaceable on said expansion sleeve toward said shoulder and overcoming said securing means after a minimum anchoring value has been achieved as said expansion body expands said expanding sleeve in the axial direction extending from the leading end thereof, and said axially deformable region being deformable only when said minimum anchoring value is achieved so that the axial deformation of said sleeve and the displacement of said disc overcoming said securing means takes place at the same time, said means for securing said disc are deformable members, said deformable members are formed as circumferentially spaced protuberances extending outwardly from the outside surface of said sleeve, and a spacing disc is positioned around the outside surface of said expansion sleeve between said protuberances and said shoulder.

2. Expansion dowel, as set forth in claim 1, wherein said expansion sleeve has axially extending slots therein extending from the leading end toward the trailing end for approximately one-third of the dimension between the leading end and the trailing end, and an annular groove formed in the inside surface of said sleeve in the region of said axially extending slots and located adjacent the ends of said slots closer to the trailing end of said expansion sleeve whereby said slots and said annular groove facilitate the radial expansion of said expansion sleeve from the leading end thereof.

3. Expansion dowel, as set forth in claim 2, wherein said axially deformable region comprises a plurality of circumferentially spaced elongated openings formed through said expansion sleeve located approximately midway between the leading end and trailing end of said sleeve, webs formed by said sleeve separating said openings with said webs being inclined relative to the axis of said sleeve extending in the leading end-trailing end direction.

4. Expansion dowel, as set forth in claim 3, wherein said threaded bolt has an axially extending projection extending from the trailing end of said bolt projecting from the threaded section of said bolt whereby blows applied to said projection are prevented from damaging said threaded section on said bolt.

* * * * *

UNITED STATES PATENT AND TRADEMARK OFFICE
CERTIFICATE OF CORRECTION

PATENT NO. : 4,692,076

DATED : September 8, 1987

INVENTOR(S) : Armin Herb

It is certified that error appears in the above-identified patent and that said Letters Patent is hereby corrected as shown below: On the title page In the heading of the Patent, it should read:

-- [73] Assignee: Hilti Aktiengesellschaft, Fürstemtum Liechtenstein

-- Attorney, Agent or Firm - Toren, McGeady & Associates P.C.

Signed and Sealed this

Tenth Day of May, 1988

Attest:

DONALD J. QUIGG

Attesting Officer

Commissioner of Patents and Trademarks